United States Patent
Ishikawa et al.

(10) Patent No.: US 7,236,221 B2
(45) Date of Patent: Jun. 26, 2007

(54) MULTILAYER OPTICAL COMPENSATION FILM, LIQUID CRYSTAL DISPLAY, AND PROCESS

(75) Inventors: Tomohiro Ishikawa, Rochester, NY (US); James F. Elman, Fairport, NY (US); David M. Teegarden, Pittsford, NY (US)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 144 days.

(21) Appl. No.: 10/859,701

(22) Filed: Jun. 3, 2004

(65) Prior Publication Data

US 2005/0270458 A1    Dec. 8, 2005

(51) Int. Cl.
*G02F 1/1335* (2006.01)
(52) U.S. Cl. .................. 349/119; 349/117; 349/118
(58) Field of Classification Search .............. None
See application file for complete search history.

(56) References Cited

U.S. PATENT DOCUMENTS

| | | | |
|---|---|---|---|
| 5,138,474 A | 8/1992 | Arakawa | |
| 5,344,916 A * | 9/1994 | Harris et al. | 528/353 |
| 5,699,136 A | 12/1997 | Arakawa et al. | |
| 6,087,007 A * | 7/2000 | Fujii et al. | 428/412 |
| 6,261,649 B1 | 7/2001 | Takagi et al. | |
| 6,606,193 B2 | 8/2003 | Umemoto | |
| 6,980,267 B1 * | 12/2005 | Kim | 349/113 |
| 2003/0193636 A1 * | 10/2003 | Allen et al. | 349/117 |
| 2004/0223103 A1 | 11/2004 | Elman | |

FOREIGN PATENT DOCUMENTS

| | | |
|---|---|---|
| EP | 1 363 156 A2 | 5/2003 |
| EP | 1 387 210 | 2/2004 |
| JP | 4-305602 | 10/1992 |
| JP | 2001-350022 | 12/2001 |
| WO | 2004/042461 | 5/2004 |
| WO | WO 2004042461 A1 * | 5/2004 |

* cited by examiner

*Primary Examiner*—David Nelms
*Assistant Examiner*—Michael H. Caley
(74) *Attorney, Agent, or Firm*—Westerman, Hattori, Daniels & Adrian, LLP.

(57) ABSTRACT

A multilayer optical compensation film includes at least one optically anisotropic first layer and at least one optically anisotropic second layer. The indices of refraction of the first layer satisfies the relation $nx_1 \geq ny_1 \geq nz_1$. The second layer includes amorphous polymer with a glass transition temperature above 160° C., and the indices of refraction of the second layer satisfy the relations $|nx_2-ny_2|<0.001$ and $nz_2-(nx_2+ny_2)/2>0.005$.

28 Claims, 7 Drawing Sheets

MULTILAYER OPTICAL COMPENSATION FILM, LIQUID CRYSTAL DISPLAY, AND PROCESS

FIELD OF THE INVENTION

The present invention generally relates to optical compensation films and to liquid crystal displays containing optical compensation films. More particularly, the present invention relates to an optical compensations film containing two or more optically anisotropic layers, to a liquid crystal display containing an optical compensation film, and to a process of forming an optical compensation film.

BACKGROUND OF THE INVENTION

In liquid crystal display (LCD) systems, a liquid crystal cell is typically situated between a polarizer and an analyzer. An incident light polarized by the polarizer passes through a liquid crystal cell and is affected by the molecular orientation of the liquid crystal material, which can be altered by the application of a voltage across the cell. The altered light then enters the analyzer. By employing this principle, the transmission of light from an external source, including ambient light, can be controlled. The energy required to achieve this control is generally much less than required for the luminescent materials used in other display types such as cathode ray tubes (CRT). Accordingly, liquid crystal technology is used for a number of electronic imaging devices, including but not limited to digital watches, calculators, portable computers, and electronic games for which lightweight, low-power consumption and long-operating life are important features. Also, replacement of the CRT television (CRT-TV) with LCD-TV is rapidly progressing. LCD modes such as In-Plane Switching (IPS) are known to offer high contrast, high speed response and good color reproduction, making LCD systems suitable for TV applications.

Contrast, color reproduction, and stable gray scale intensities are important quality attributes for electronic displays. The primary factor limiting the contrast of an LCD system is the propensity for light to "leak" through liquid crystal elements or cells which are in the dark or "black" pixel state. Furthermore, the leakage and hence contrast of a liquid crystal display are also dependent on the direction from which the display screen is viewed. Typically the optimum contrast is observed only within a narrow viewing angle range centered about the normal incidence to the display and falls off rapidly as the viewing direction deviates from the display normal. In color displays, the leakage problem not only degrades contrast but also causes color or hue shifts with an associated degradation of color reproduction. This is a common problem with most display modes. However, in the IPS mode LCD, the liquid crystal optic axis changes its direction while remaining in the plane of the liquid crystal cell. This results in better viewing angle characteristics than those associated with other more conventional modes such as the Twisted Nematic (TN) mode.

One of the factors that permits light leakage in the dark state of the LCD is the viewing angle dependence of the crossed polarizes. Here "cross polarizers" shall be understood as a pair of two polarizers with their transmission axes (or equivalently, absorption axes) forming an angle of 90±5°. The polarizers are absorptive dichroic type commonly used for LCD display applications. Very little light can go through crossed polarizers provided the light is impinged in the direction normal to the plane of the crossed polarizers. However, when the light propagation direction deviates from the normal, there occurs a significant amount of light leakage with the maximum leakage occurring at a large polar viewing angle and 45 degrees of azimuthal viewing angle relative to the transmission axis of the polarizer. This is because the effective angle between the transmission axes of the polarizers deviates from 90°.

One way to reduce the light leakage through two crossed polarizers is to insert a compensator between them. The compensators used for polarizers are nominally a combination of an A-plate and a C-plate, as suggested by Chen et al. ("Optimum film compensation modes for TN and VA LCDs", SID 98 Digest, pp. 315–318 (1998)).

U.S. Pat. No. 6,606,193 discloses a compensator using two biaxial films having $0.15 \leq Nz \leq 0.35$ and $0.65 \leq Nz \leq 0.85$, respectively, where Nz is defined as $(nx-nz)/(nx-ny)$ with a relation $nx>ny$. Here, x and y lie in the plane of the layers, and z lies in the plane normal to the layers. Thus, indices of refraction satisfy $nx>nz>ny$. The two biaxial films are placed between the pair of crossed polarizers of the LCD. The fast axes (the y direction having index of refraction ny) of both biaxial films are placed parallel to the absorption axis of one of the polarizers. A similar technique is disclosed in Japanese patent publication JP2001-350022, where two biaxial films are used to suppress spectrum dependence of light leakage.

In the afore-mentioned references using compensation films, the aim is to reduce the viewing angle dependence of the effective angle formed by the transmission (or absorption) axis of the crossed polarizers. These techniques can be used to increase the contrast ratio of, for example, the IPS mode liquid crystal display.

Saitoh et al. (SID digest 1998 page 706–709) proposed viewing angle improvement in the IPS mode liquid crystal display (IPS-LCD). A single biaxial compensation film was used in combination with the IPS mode liquid crystal cell and a pair of polarizers. The direction of slow axis of the biaxial compensation film is parallel to the direction of transmission axis of the polarizer and the azimuthal direction of the liquid crystal optic axis of the IPS mode liquid crystal cell in the OFF state. The transmission axis of the other polarizer is perpendicular to the transmission axis of the other polarizer. The configuration reduces the light leakage through the crossed polarizers and thereby increases the contrast ratio of the IPS-LCD.

While compensation film techniques have been suggested for reducing light leakage through the crossed polarizers or combination of crossed polarizer and liquid crystal cells (e.g., IPS mode liquid crystal cells), conventional techniques fail to provide a low-cost and/or simple method of providing such compensation films. For Chen's method to work, the sign of retardation of the A and C plate must have the same sign. U.S. published patent application US 2004002750, filed by the current inventors and incorporated herein by reference, discloses a manufacturing process for a negative C plate. However, there is no straightforward manner to obtain a negative A plate with sufficient phase retardation. Thus, the combination of negative A and C plates for compensation is not plausible. While a positive A plate is widely available, a positive C plate is not. A positive C plate can be made from uniformly and perpendicularly aligned liquid crystal polymer. Polymerizable liquid crystal, such as the one disclosed in U.S. Pat. No. 6,261,649 gives perpendicular alignment. However, liquid crystal polymers are high cost compounds and creating a uniform alignment of liquid crystals poses significant obstacle in large-scale manufacturing. Often non-uniform alignment occurs even in a small size which results in a hazy appearance. Such haze decreases the optical transmission of the compensation film. Polymerizable liquid crystal also requires a photo-polymerization process in order to freeze the perpendicular alignment of the liquid crystal polymer, adding extra processes and cost.

Use of biaxial films also poses problems. Biaxial plates used in both U.S. Pat. No. 6,606,193 and JP2001-350022 have the property nx>nz>ny. Films with such optical property cannot be made without difficulty. Standard manufacturing processes (e.g., stretching of the polymer film) gives films with nx>ny≧nz. Several methods have been suggested to obtain increased nz so that the film can have nx>nz>ny. U.S. Pat. No. 6,606,193 teaches a process in which heat-shrinkable base film is bonded to the secondary film. By heating such an article, the base film shrinks with heat resulting in a higher nz in the secondary film. Another method is the alignment of the polymer segment by an applied electric field. The applied field aligns the polymer segments in the film normal direction, and thus the procedure achieves a higher nz value. Often, however, subsequent stretch is necessary to control all three indices of refraction, nx, ny and nz to their desired values, and careful stretching process is necessary to maintain the relation nx>nz>ny in the final films. Without such fine-tuned stretching, only films having nx>ny≧nz are obtained. Such a fine-tuned process is not suitable for mass manufacturing and may jeopardize the manufacturing repeatability of optical properties of the film.

Thus, problems arise in attempts to provide a multilayer optical compensation film that can be used to prevent light leakage through an LCD in the dark or "black" state.

SUMMARY OF THE INVENTION

According to one aspect of the present invention, a multilayer optical compensation film is provided which includes at least one optically anisotropic first layer and at least one optically anisotropic second layer. The indices of refraction of the first layer satisfy the relation $nx_1 \geq ny_1 \geq nz_1$. The second layer includes amorphous polymer with a glass transition temperature above 160° C., and the indices of refraction of the second layer satisfy the relations $|nx_2-ny_2|<0.001$ and $nz_2-(nx_2+ny_2)/2>0.005$.

According to another aspect of the present invention, the above-described multilayer optical compensation film is located between one or both of a pair of crossed polarizers and a liquid crystal cell.

According to yet another aspect of the present invention, a process of forming the above-described multilayer optical compensation film is provided.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The compensation film described herein can be used to improve the image quality and contrast ratio of a liquid crystal display (LCD) system. The compensation film can be manufactured with a simple process that does not require use of liquid crystal polymer or any alignment procedure of liquid crystal polymer. Also, manufacture of the compensation film does not require shrinking of the film, application of an electric field to align polymer segments, or a subsequent fine-tuned stretching process.

Figure 1:
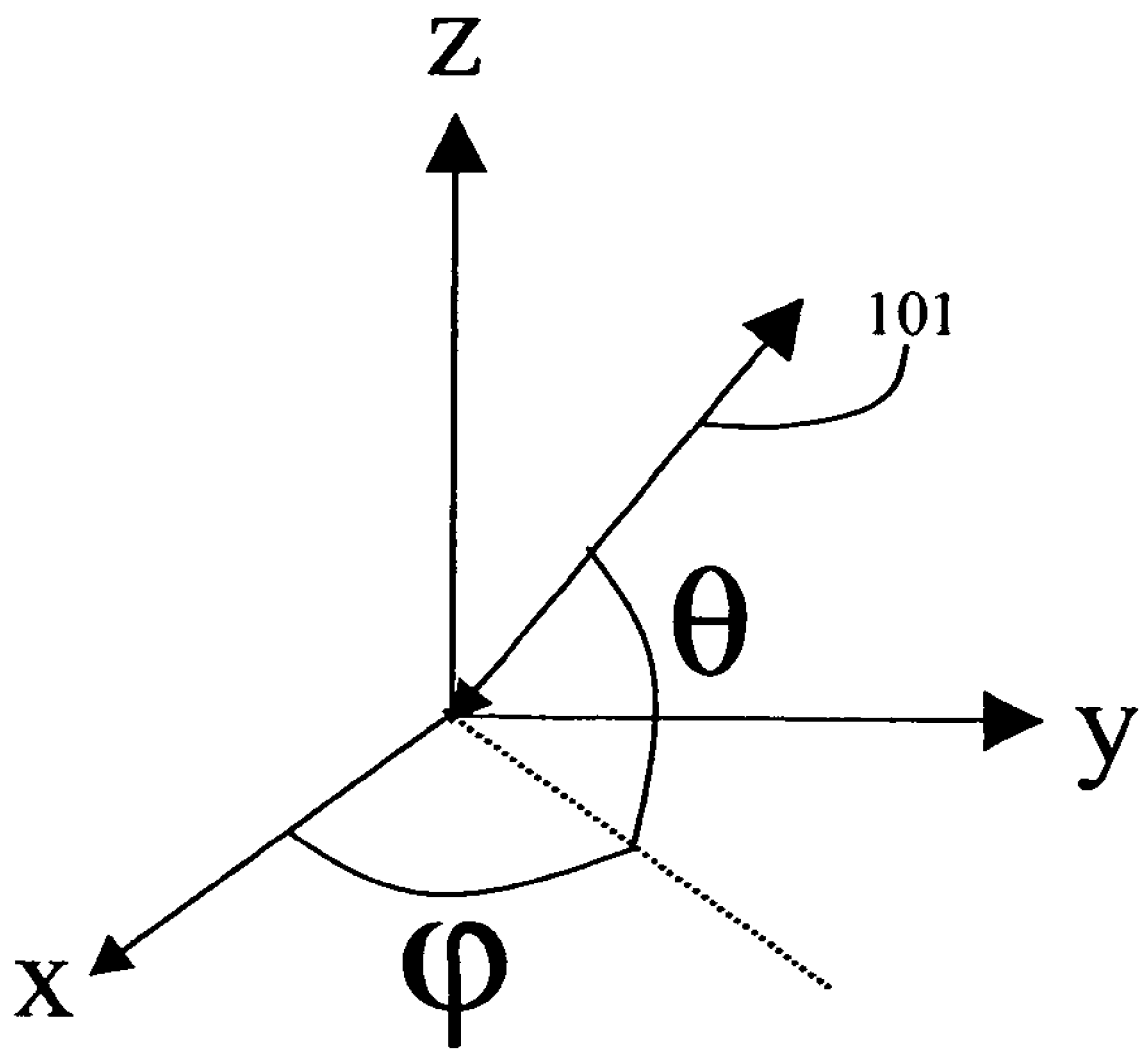
FIG. 1 shows the definitions of azimuthal angle φ and tilt angle θ of the optic axis.
Figure 2A:
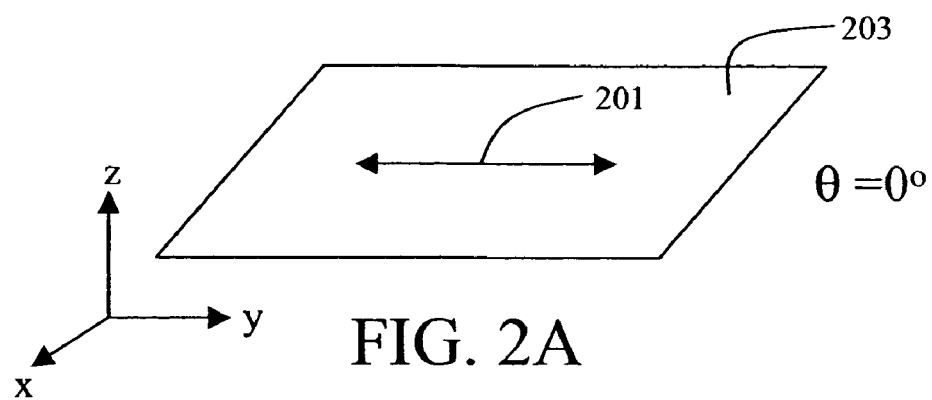
FIG. 2A and FIG. 2B show the optic axis direction with respect to the planes of of A and C plates, respectively.
Figure 2B:
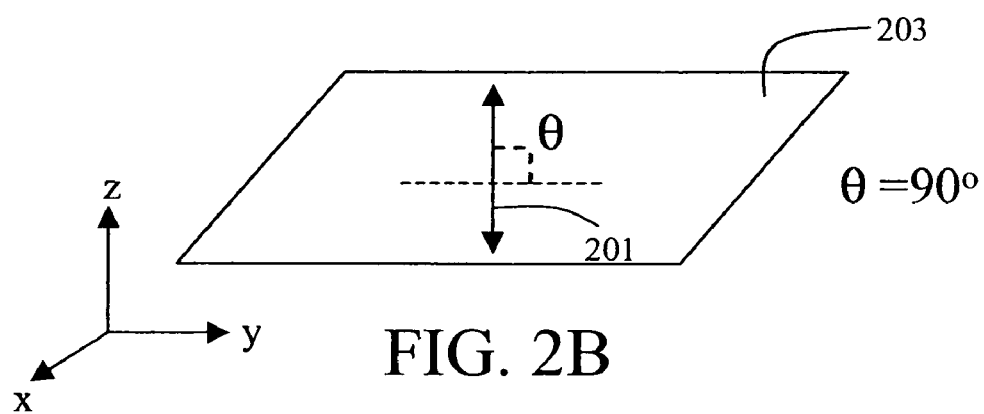
Figure 3:
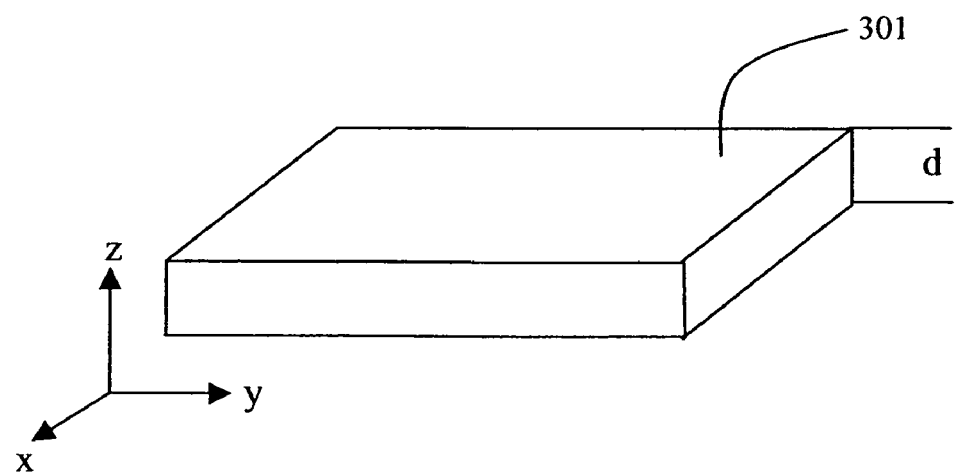
FIG. 3 is a view of a layer with thickness d and x-y-z coordinate system attached to the layer.

With reference to FIGS. 1 through 3, the following definitions apply to the description herein:

"x", "y" and "z" define directions relative to a given layer, where x and y lie perpendicularly to each other in the plane of the layer, and z is normal the plane of the layer.

"Optic axis" is denoted by reference number 101 of FIG. 1 and refers to the direction in which propagating light does not see birefringence. Its direction is described by the azimuthal angle φ and the tilt angle θ. As can be seen in FIG. 1, the tilt angle θ measures the angle between the x-y plane and the optic axis 101, and the azimuthal angle φ is an angle measured in the x-y plane with respect to the reference direction x.

"ON and OFF state" refers to respective states with and without an applied voltage to the liquid crystal cell.

"A-plate" and "C-plate" refer to the plates schematically illustrated in FIGS. 2A and 2B, respectively. The A-plate 203 is defined by the condition θ=0°, i.e., the optic axis 201 is in the plane of the plate 203. In contrast, the C-plate 204 is defined by the condition θ=90°, i.e., the optic axis 201 is perpendicular to the plane of the plate 204. Each plate can be a positive or negative plate depending on the sign of the birefringence of the constituent material.

"nx", "ny" and "nz" are indices of refraction of a layer in the x, y and z directions, respectively. Following the convention well known in the art, the relation nx≧ny is taken for the indices of refraction in the plane of the layer. Hereinafter, notation is used such that $nx_1$, $ny_1$ and $nz_1$ are indices of refraction for the first layer, and $nx_2$, $ny_2$ and $nz_2$ are those for the second layer.

"Optically uniaxial" means that at least two of nx, ny and nz are substantially equal, i.e., an absolute value of the difference between at least two of nx, ny and nz is less than 0.005. "Optically biaxial" means that none of nx, ny and nz are substantially equal to the other.

"Intrinsic Birefringence $\Delta n_{int}$" of a polymer refers to the quantity defined by (ne−no), where ne and no are the extraordinary and ordinary index of the polymer, respectively. Intrinsic birefringence is determined by factors such as the polarizabilities of functional groups and their bond angles with respect to the polymer chain. Indices of refraction nx, ny and nz of a layer are dependent upon manufacturing process conditions of the layer and $\Delta n_{int}$ of the polymer of the layer.

"Out-of-plane phase retardation, $R_{th}$," of a layer is a quantity defined by $[nz-(nx+ny)/2]d$, where d is the thickness of the layer 301 shown in FIG. 3. The quantity $[nz-(nx+ny)/2]$ is referred to as "out-of-plane birefringence, $\Delta n_{th}$". If $nz>(nx+ny)/2$, then $\Delta n_{th}$ and Rth are positive. If $nz<(nx+ny)/2$, then $\Delta n_{th}$ and Rth are negative. Without limiting the invention, the values of $\Delta n_{th}$ and Rth hereafter are given at the wavelength $\lambda=550$ nm.

"In-plane retardation Rin" of a layer 301 is defined by $|nx-ny|d$. Without limiting the invention, the value of Rin hereafter is given at $\lambda=550$ nm.

"Amorphous" means a lack of long-range order. Thus an amorphous polymer does not show long-range order as measured by techniques such as X-ray diffraction.

"Chromophore" is defined as an atom or group of atoms that serve as a unit in light adsorption. (Modern Molecular Photochemistry, Nicholas J. Turro Editor, Benjamin/Cummings Publishing Co., Menlo Park, Calif. (1978) Pg 77). Typical chromophore groups include vinyl, carbonyl, amide, imide, ester, carbonate, aromatic (i.e. heteroaromatic or carbocylic aromatic such as phenyl, naphthyl, biphenyl, thiophene, bisphenol), sulfone, and azo or combinations of these chromophores. A non-visible chromophore is one that has an absorption maximum outside the range of $\lambda=400-700$ nm.

"Contiguous" means that articles are in contact to each other. In contiguous two layers, one layer is in direct contact to the other. Thus, if a polymer layer is formed on the substrate by coating, the substrate and the polymer layers are contiguous.

Reference will now be made to the drawings in which the various elements of the present invention will be given numerical designations and in which the invention will be discussed so as to enable one skilled in the art to make and use the invention.

The multilayer optical compensation film of embodiments of the present invention includes first and second optically anisotropic layers. The first satisfies the relation (1):

$$nx_1 \geq ny_1 \geq nz_1 \quad (1)$$

and the second layer satisfies the relations (2) and (3):

$$|nx_2-ny_2|<0.001 \quad (2)$$

$$\Delta n_{th}=nz_2-(nx_2+ny_2)/2>0.005 \quad (3)$$

In addition, the second layer includes amorphous polymer with a glass transition temperature above 160 °C. Preferably, the first and second layers are contiguous.

It is noted that the first "layer" and the second "layer" can each be constituted by a single continuous layer, or by a plurality of layers satisfying the aforementioned relations.

Characteristics of the first and second layers are described in turn below.

The first layer has indices of refraction satisfying the relation (1). In the case where $nx_1 \geq ny_1 = nz_1$, the first layer is optically uniaxial. The optic axis is in the plane of the substrate and it is therefore an A-plate (FIG. 2A). In most cases, however, the indices of refraction satisfy $nx_1>ny_1>nz_1$ and the first layer is optically biaxial. In both cases, the first layer physically takes the form of a film and is made from polymer or glass.

Examples of materials for the first layers include triacetylcellulose (TAC), cellulose acetate butylate (CAB), cyclic polyolefin, polycarbonate, polysulfonate, poly norbornene, other polymers known in the art, glass, and combinations thereof. These materials can be made into a film form by solvent casting, heat extrusion, or other methods such as those disclosed in US 2003/0215608A1 and US 2003/0215582A1, incorporated herein by reference, wherein the first layer would be solvent coated onto a moving carrier substrate. If necessary, the film is stretched to achieve the relation $nx_1>ny_1 \geq nz_1$. If the first layers are made from polymer film with positive $\Delta n_{int}$, indices of refraction in the plane of the layer satisfy $nx_1>ny_1$, where "x" denotes the primary direction of stretching and "y" is the direction perpendicular to x. On the other hand, polymer film with negative $\Delta n_{int}$ gives $nx_1>ny_1$, but y is now the primary stretching direction and x is perpendicular to y. By stretching polymeric materials, individual polymer chain segments are oriented predominantly to the direction of primary stretch, thus increasing the birefringence of the polymer layer. As it is necessary to orient the polymer segment, the stretching is carried out above the glass transition temperature Tg of the polymeric materials. Thus, the polymeric film is heated above Tg and stretched. Otherwise the birefringerice diminishes as the applied tension for stretching is removed.

Another method is to stretch the film while solvents are incorporated within the film. Residual solvent after the casting of the film effectively lowers the Tg of the polymer, and thus stretching at room temperature becomes possible. With this method, the film can be stretched immediately after the polymer is solvent-casted into a film form. The film can be stretched uniaxially or biaxially. In uniaxial stretching, the film is stretched only in one direction. In biaxial stretching, two stretching directions are typically perpendicular to each other. The direction with the larger amount of stretching becomes the primary stretching direction.

The present invention is not limited to particular stretching mechanisms or techniques so long the stretched film has sufficient uniformity in indices of refraction.

The in-plane retardation Rin of the first layer is preferably 0 nm<Rin<300 nm, or more preferably 10 nm<Rin<275 nm.

The thickness of the first layer is not critical. However, overly thick layers can result in a bulky LCD module, and conversely, if the first layer is too thin, handling of the compensation film becomes cumbersome. Thus, the thickness of the first layers is preferably between 10 μm to 200 μm, or more preferably between 20 μm to 100 μm.

Turning now to the second layer, the relation (2) implies that the optic axis is essentially in the z direction and thus normal to the plane of the layers. Further, the birefringence of the second layers is positive as dictated by the relation (3). Thus, the second layer is essentially a positive C-plate (FIG. 2B) having a small in-plane birefringence, $0<|nx_2-ny_2|<0.001$ (by relation (2)) and positive out-of-plane birefringence $\Delta n_{th}$ larger than 0.005 (relation (3)).

Figure 4A:
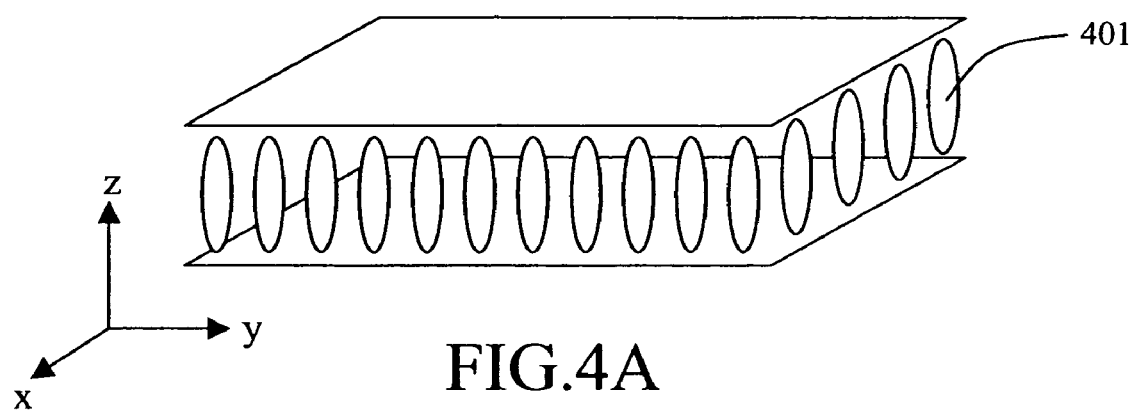
FIG. 4A and FIG. 4B are schematic views of perpendicular alignment of liquid crystals, and random in-plane orientation of an amorphous polymer chain, respectively.
Figure 4B:
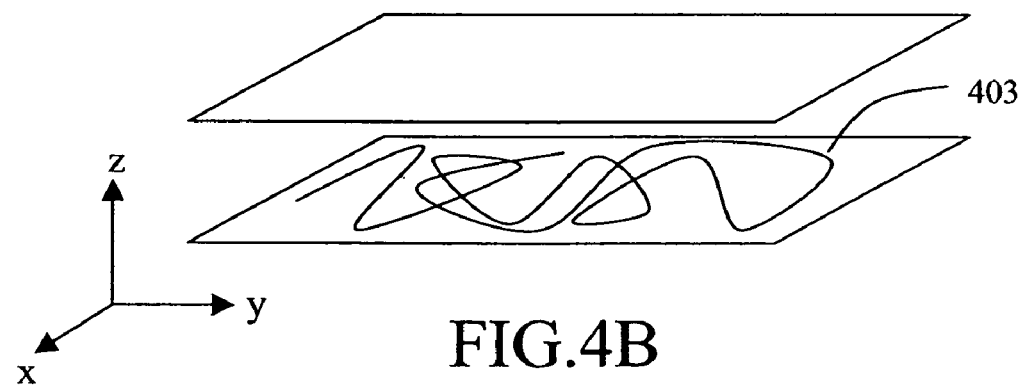

To generate the second layer having positive out-of-plane birefringence $\Delta n_{th}$, solvent coat of amorphous polymer with negative intrinsic birefringence $\Delta n_{int}$ is used. As is well known to those who are skilled in the art, the out-of-plane birefringence of polymer layer, $\Delta n_{th}$, is given by $\Delta n_{th}=S\Delta n_{int}$, where S is an order parameter of the polymer segment. Thus, to generate positive $\Delta n_{th}$, two combinations are possible: 1) positive S and positive $\Delta n_{int}$, or 2) negative S and negative $\Delta n_{int}$. Referring to FIG. 4A, conventional techniques having a perpendicular alignment (in the z direction) of liquid crystals 401 falls into the first combination 1): positive S ($0 \leq S \leq 1$) and positive $\Delta n_{int}$. However, the layers thus generated using liquid crystal tend to have misaligned areas causing haze. The haze decreases optical transmission and is undesirable. In contrast with conventional techniques, the positive $\Delta n_{th}$ of the second layers according to embodiments of the present invention results from combination 2):

negative S and negative $\Delta n_{int}$. Referring to FIG. 4B, the polymer chain 403 of the amorphous polymer is randomly oriented in the plane of the polymer layer. For such an orientation, the order parameter S of the polymer chain is in the range of $-0.5<S<0$. Thus, in order to obtain positive $\Delta n_{th}$ for amorphous polymeric layer on the substrate, polymers with negative $\Delta n_{int}$ are used. The negative value of S has to be sufficiently large or relation (3) cannot be satisfied.

Examples of such polymers would include materials that have non-visible chromophores off of the polymer backbone. Such non-visible chromophores would include: vinyl, carbonyl, amide, imide, ester, carbonate, sulfone, azo, and aromatic heterocyclic and carbocyclic groups (e.g. phenyl, naphthyl, biphenyl, terphenyl, phenol, bisphenol A, and thiophene). In addition, combinations of these non-visible chromophores could be desirable (i.e. copolymers). Examples of such polymers and their structures are shown below.

EXAMPLE I

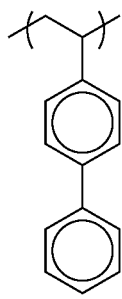

poly (4 vinylbiphenyl)

EXAMPLE II

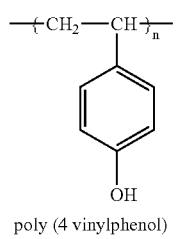

poly (4 vinylphenol)

EXAMPLE III

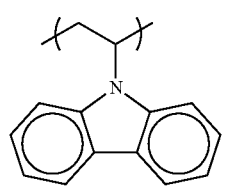

poly (N-vinylcarbazole)

EXAMPLE IV

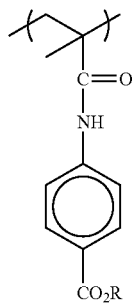

poly(methylcarboxyphenylmethacrylamide)

EXAMPLE V

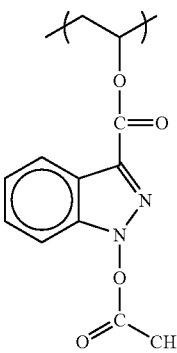

poly[(1-acetylindazol-3-ylcarbonyloxy)ethylene]

EXAMPLE VI

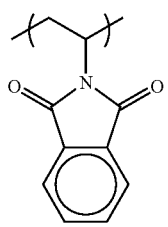

poly(phthalimidoethylene)

EXAMPLE VII

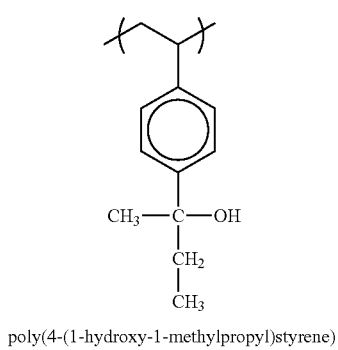

poly(4-(1-hydroxy-1-methylpropyl)styrene)

EXAMPLE VIII

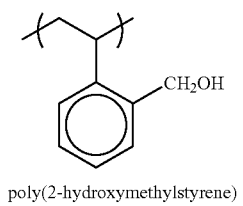

poly(2-hydroxymethylstyrene)

EXAMPLE IX

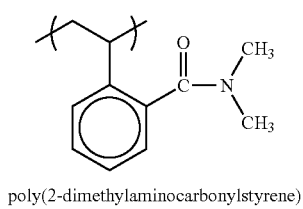

poly(2-dimethylaminocarbonylstyrene)

EXAMPLE X

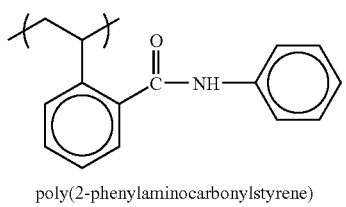

poly(2-phenylaminocarbonylstyrene)

EXAMPLE XI

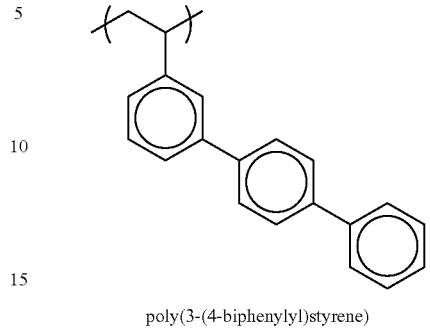

poly(3-(4-biphenylyl)styrene)

EXAMPLE XII

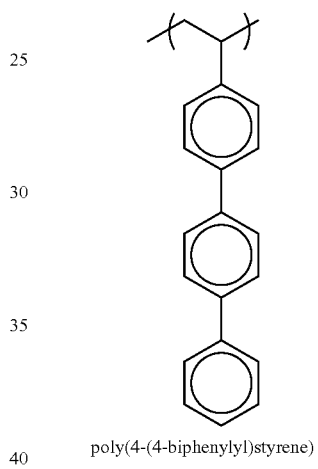

poly(4-(4-biphenylyl)styrene)

Another important factor is to obtain finite negative value of S. One way to achieve such negative S values is to solvent coat polymers whose glass transition temperature Tg is greater than 160° C. Such polymers will not have sufficient time to relax upon solvent evaporation and will retain a negative S value.

As alignment of the polymer segment is not thermodynamically controlled, the negative S value is achieved during the coating and drying process. After examinations of various polymers with negative $\Delta n_{int}$, the current inventors discovered that only amorphous polymers having a Tg higher than 160° C., retain a sufficiently large negative value of S. Thus, the second layers satisfying both relations (2) and (3) can only be obtained from such polymers. These amorphous polymers do not have sufficient time to relax upon solvent evaporation and will retain a sufficiently large negative S value. The thickness of the coating is preferably less than 30 μm, more preferably less than 20 μm, and most preferably less than 10 μm.

In the compensation film of embodiments of the present invention, other additional first layers can be included. For example, adhesion promotion layer can be disposed between the first and the second layers. Good adhesion between the layers is critical for application, especially in the assembling process of the LCD unit and the use of the LCD in high temperature-humidity environments. Another example of an additional first layer is a barrier layer which prohibits diffusion of the chemical species that have adverse effects on the optical properties of the first and the second layers. For example, the barrier layer may potentially be desired or necessary if the first layer is TAC film. Typically TAC contains low-molecular weight plasticizer to improve mechanical properties. It is often the case that the plasticizer migrates to the second layer, degrades the polymer alignment state and lowers the $\Delta n_{th}$ (thus Rth). Barrier and/or adhesion layers can be placed between the first layer and the second layer, or between two first layers or two second layers in the case where either is made up of more than one layer. In many cases, a single layer can function as both barrier and adhesion layers. In order to optimize both functionalities, the layer can contain two or more polymers. For example, the layer may contain a water-soluble polymer such as gelatin and a water dispersible polymer such as a polyesteriomonomer. Alternatively, the barrier layer may contain two different water dispersible polymers such as polyesterionomer and polyurethane. The second layer would be directly applied on to the moving carrier by solvent coating.

The Rth of the multilayer compensator is preferably larger than 20 nm, or more preferably between 30 nm and 300 nm, or most preferably between 40 nm and 200 nm. The thickness of multilayer compensator is preferably less than 250 μm, or more preferably less than 200 μm, and most preferably between 20 μm and 100 μm.

Figure 5A:
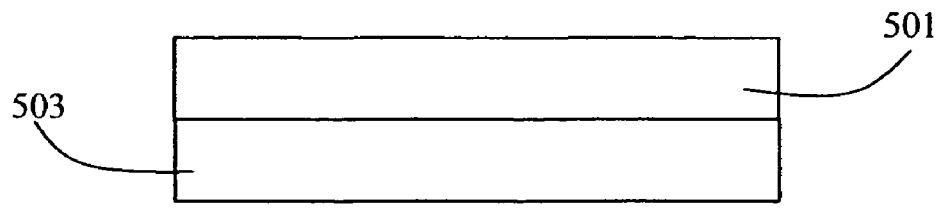
FIG. 5A, FIG. 5B and FIG. 5C are cross sectional schematics of exemplary compensation films according to embodiments of the present invention.
Figure 5B:
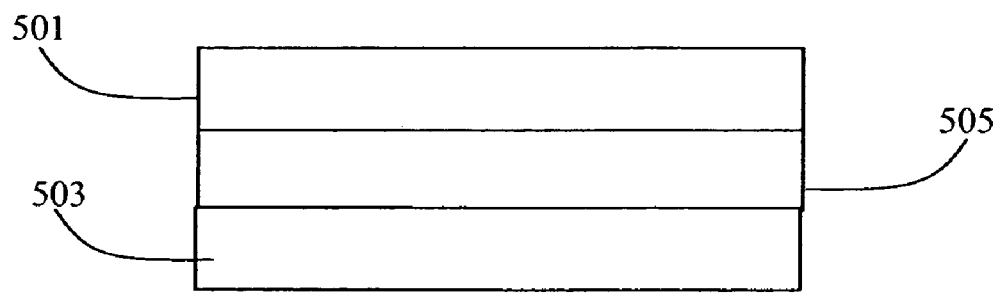
Figure 5C:
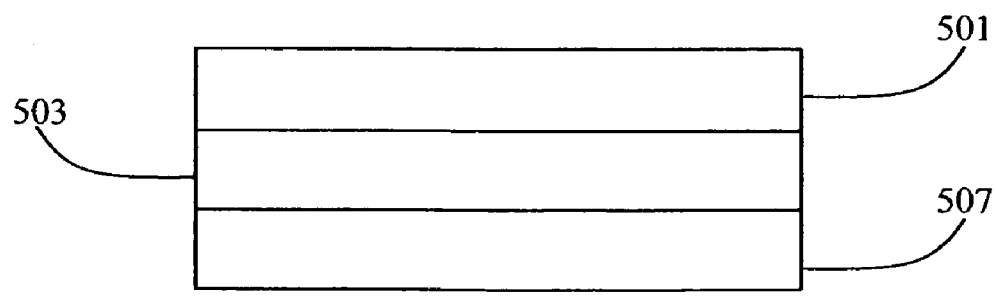

FIGS. 5A, 5B and 5C show the schematic cross sections of exemplary compensation films according to the invention. It is noted that relative dimensions illustrated in the figures may not scale to the actual dimensions of the compensation films.

In the structure shown in FIG. 5A, a single second layer 501 is disposed directly on a single first layer 503. In the compensation film shown in FIG. 5B, an additional first layer 505 (such as a barrier layer and/or adhesive layer) is inserted between the second layer 501 and the first layer 503. FIG. 5C is a structure where the second layer is constituted by two layers 501 and 507 disposed on single first layer 503. Those who are skilled in the art can readily conceive other possible structures that are appropriate for individual applications.

Figure 6:
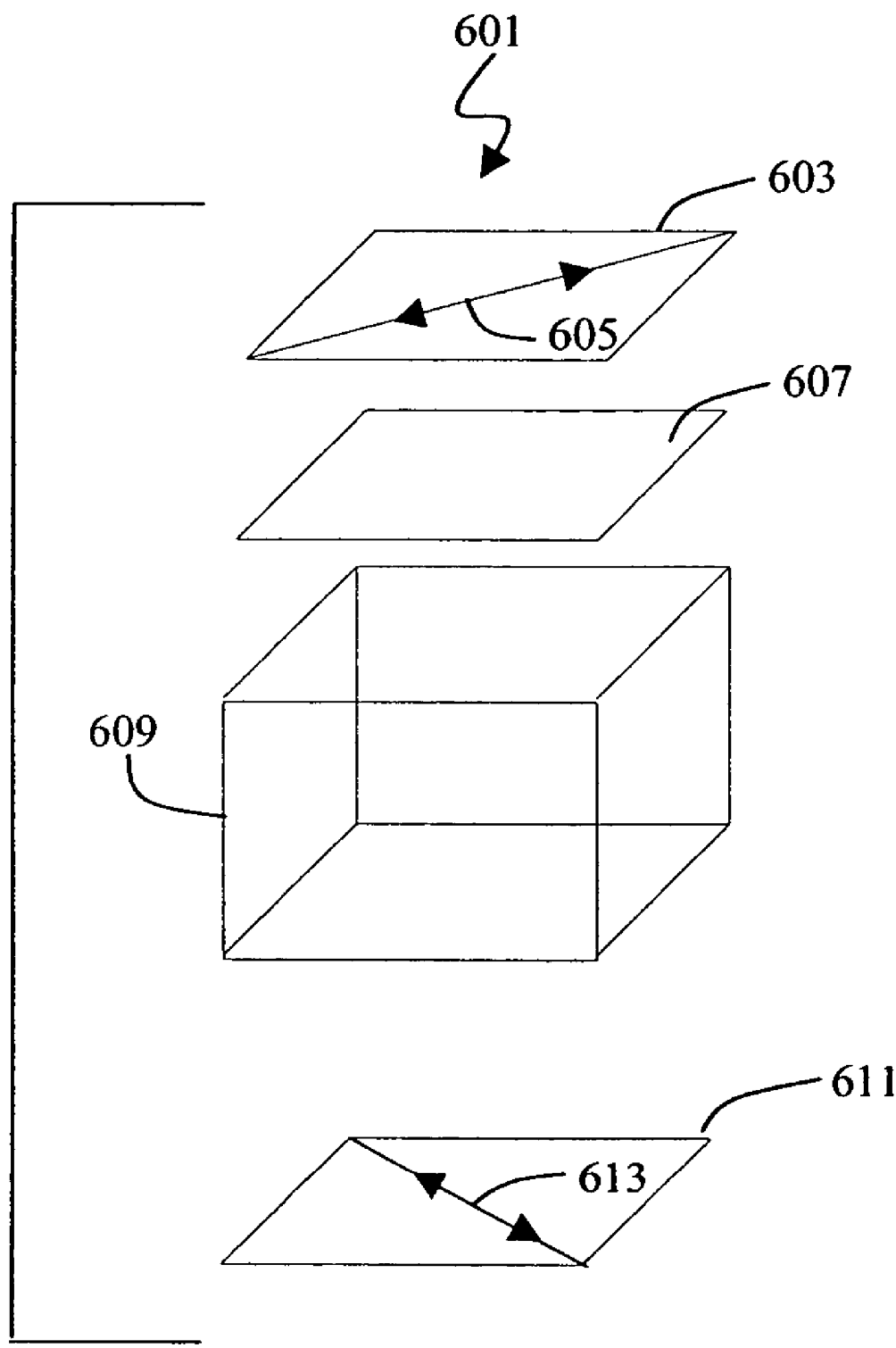
FIG. 6 is a schematic of a liquid crystal display according to an embodiment of the present invention.

FIG. 6 schematically illustrates an LCD 601 using the compensation film according to an embodiment of the present invention. The relative dimensions illustrated in the FIG. 6 may not scale to the actual dimensions of the LCD. The LCD 601 includes pair of crossed polarizers 603 and 611 having transmission axes (or equivalently absorption axes) 605 and 613 forming an angle 90±5°, liquid crystal cell 609, and a compensation film 607. The compensation film 607 is placed adjacent to the liquid crystal cell 607 on the side of the polarizer 603. Although not shown, the LCD 601 may optionally include a second compensation film on the side of the polarizer 611.

Compared to prior art compensation films, the compensation film according to the invention can be manufactured with a simple process that does not require use of liquid crystal polymer or any alignment procedure of liquid crystal polymer. Thus, it is free from haze. It does not involve shrinking of the film, application of an electric field to align the polymer segment, or subsequent fine-tuned stretching processes. The invention also enables the use of standard films having nx>ny≧nz instead of the ones with nx>nz>ny that are difficult to obtain. The compensation films of the invention can be made with much simpler processes, and are suitable for mass manufacturing.

The following specific examples are presented to particularly illustrate the invention and should not be construed to place limitation thereon.

Figure 7A:
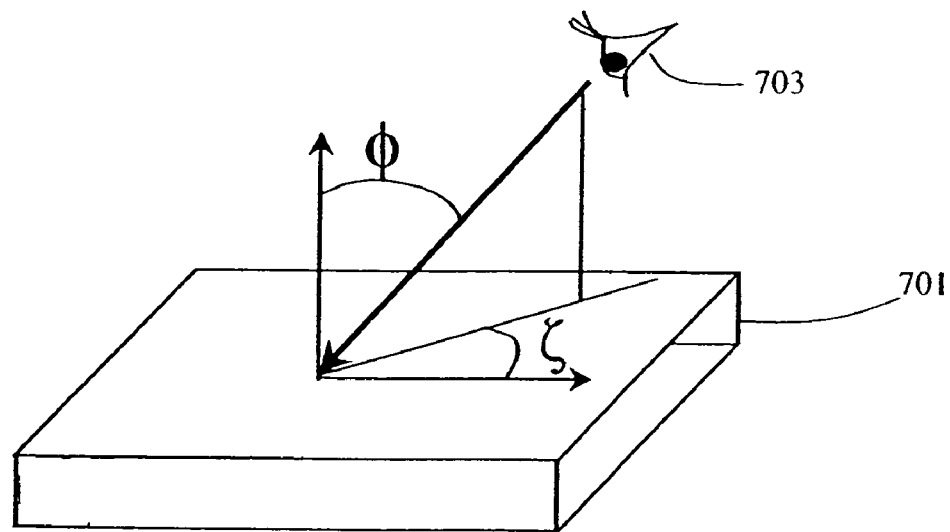
FIG. 7A is a schematic showing definitions of polar and azimuthal viewing angles.
Figure 7B:
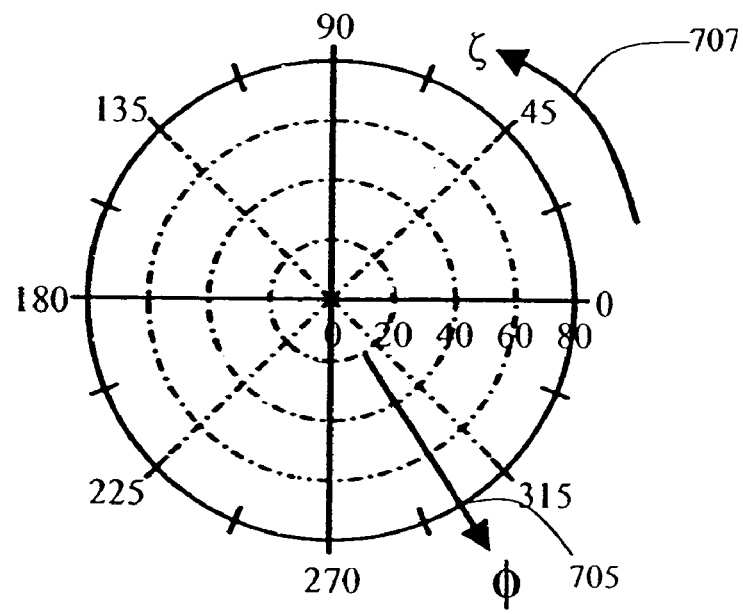
FIG. 7B is a polar plot format.

The performance of the exemplary compensation films is measured in terms of an iso-leakage plot of an LCD in the dark state with polar and azimuthal viewing angles. Polar and azimuthal viewing angles are defined according to FIG. 7A with respect to the LCD 701. The observer 703 views the LCD 701 from the direction specified by the polar viewing angle φ and azimuthal viewing angle ξ. The light leakage is measured in terms of % transmission of the LCD in the dark state. As it is in the dark state, the higher performance is yield for lower transmission. The results are plotted in polar plot form as shown in FIG. 7B. The concentric circles correspond to different φ (0°, 20°, 40°, 60° and 80°) and radial lines correspond to ξ (=0°, 45°, 90°, 135°, 180°, 225°, 270°, and 315°). Arrows 705 and 707 indicate the directions of increasing φ and ξ, respectively.

EXAMPLE 1

Figure 7C:
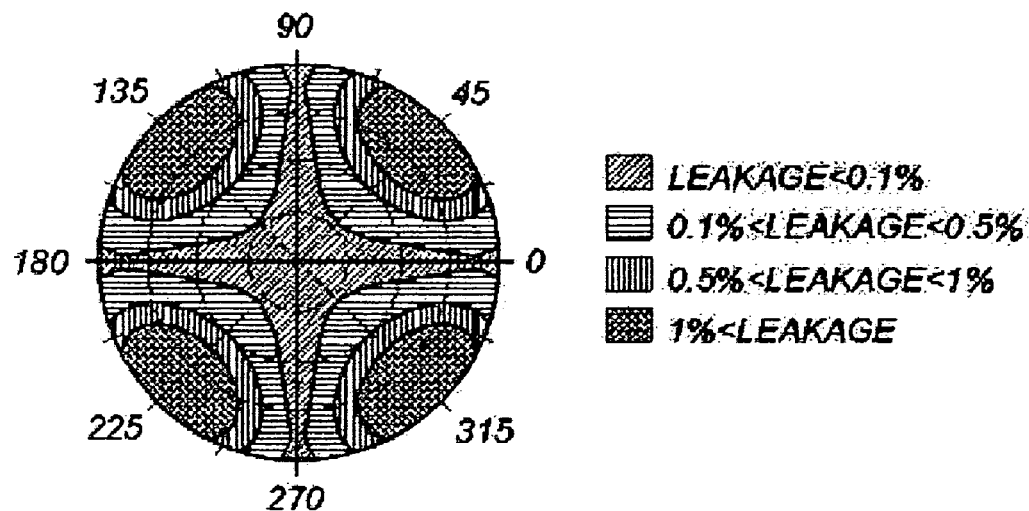
FIG. 7C and FIG. 7D are iso-leakage plots for an LCD without and with the inclusion of a compensation film, respectively.

FIG. 7C shows the iso-leakage plot of the LCD including crossed polarizers and IPS mode liquid crystal cell. No compensation film was used. If φ is higher than 50°, the leakage exceeds 1% or higher at ξ=45°, 135°, 225° and 315°. Thus, contrast of the IPS-LCD is significantly reduced at these viewing angle ranges.

EXAMPLE 2

Figure 7D:
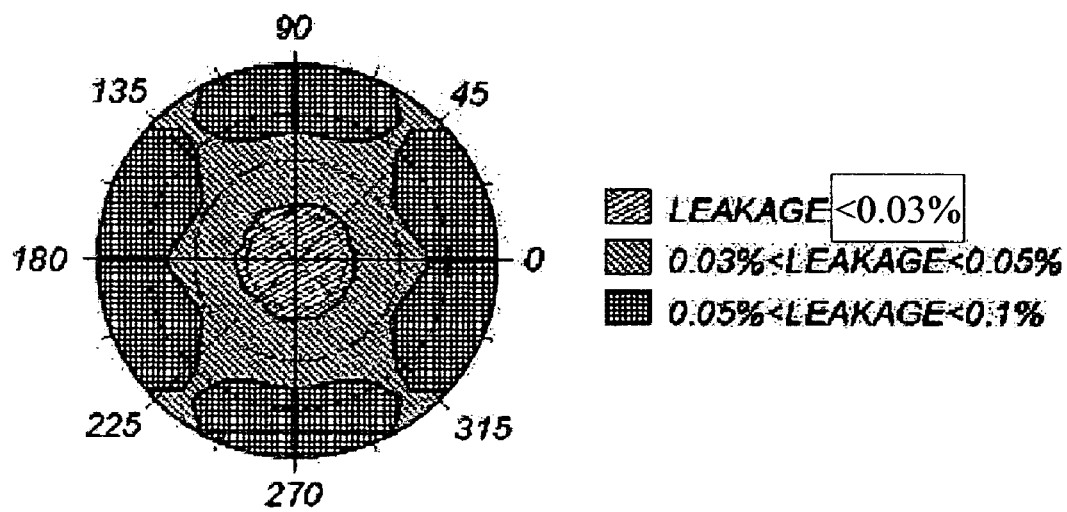

FIG. 7D shows the iso-leakage plot of crossed polarizers with IPS mode liquid crystal when compensation films were applied. The arrangement is the same as shown in FIG. 6. The compensation film includes one first layer and one second layer. The first layer of the compensation film is a stretched cyclic polyolephin having indices of refraction, $nx_1=1.5316$, $ny_1=1.5307$ and $nz_1=1.5306$ (as measured with an ellipsometer, model M2000V, J.A. Woollam Co. at λ=550 nm). Thus $nx_1>ny_1>nz_1$, satisfying the above-described relation (1). The thickness of the first layer is 100 μm. The second layer is formed by coating the first layer with a solution (15% solids in toluene) of poly(N-vinylcarbazole), (from Acros Organics). This poly(N-carbazole) is found to have a Tg of 172° C., by differential scanning calorimetry (DSC).

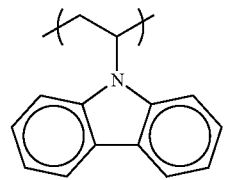

The second layer does not show any sign of long-range order. Therefore the layer is determined to be comprised of an amorphous polymer. The indices of refraction of the second layer are measured (by ellipsometry at λ=550 nm, model M2000V, J.A. Woollam Co.) to be $nx_2=1.690$, $ny_2=1.690$ and $nz_2=1.710$, which satisfy the above-described relations (2) and (3). The thickness is 8.1 μm.

In comparison to FIG. 7C, the leakage is drastically decreased. It is surprising that in the entire viewing angle range (0°≦φ≦80°, 0°≦ξ<360°), the light leakage is less than 0.1%. Thus the contrast ratio of the IPS-LCD is considerably improved.

It will be understood that the particular embodiment described above are only illustrative of the principles of the present invention, and that various modification could be made by those skilled in the art without departing from the scope and spirit of the present invention.

PARTS LIST 101 optic axis specified by the angles φ and θ
201 optic axis
203 plate
204 plate
301 layer
401 liquid crystals
403 polymer chain
501 second layer
503 first layer
505 additional first layer
507 second layer
601 LCD
603 polarizer
605 transmission axis of polarizer 603
607 compensation film
609 liquid crystal cell
611 polarizer
613 transmission axis of polarizer 611
701 LCD
703 observer
705 arrow indicating the increasing direction of polar viewing angle φ
707 arrow indicating the increasing direction of azimuthal viewing angle ζ
nx index of refraction of a layer in x direction
ny index of refraction of a layer in y direction
nz index of refraction of a layer in z direction
$nx_1$ index of refraction in x direction of the first layer
$ny_1$ index of refraction in y direction of the first layer
$nz_1$ index of refraction in z direction of the first layer
$nx_2$ index of refraction in x direction of the second layer
$ny_2$ index of refraction in y direction of the second layer
$nz_2$ index of refraction in z direction of the second layer
no ordinary index of refraction
ne extraordinary index of refraction
$\Delta n_{th}$ out-of-plane birefringence
d thickness of the layer or film
Rth out-of-plane phase retardation
Rin in-plane phase retardation
λ wavelength
$T_g$ glass transition temperature
θ tilt angle specifying the optic axis direction
φ azimuthal angle specifying optic axis direction
φ polar viewing angle
ζ azimuthal viewing angle
S order parameter

What is claimed is:

1. A multilayer optical compensation film comprising at least one optically anisotropic first layer and at least one optically anisotropic second layer contiguous to the first layer, wherein said first layer satisfies the relation:

$nx_1 \geq ny_1 \geq nz_1$ wherein said second layer comprises amorphous polymer with a glass transition temperature above 160° C., and satisfies the relations:

$|nx_2-ny_2|<0.001$ $nz_2-(nx_2+ny_2)/2 > 0.005$ wherein $nx_1$, $ny_1$ and $nz_1$ are indices of refractions of the first layer in x, y and z directions of the first layer, respectively, and wherein $nx_2$, $ny_2$ and $nz_2$ are indices of refractions of the second layer in x, y and z directions of the second layer, respectively.

2. The film of claim 1, wherein said first or second layer is contiguous to a carrier substrate.

3. The film of claim 1, further comprising an intermediate layer between the first and second layers.

4. The film of claim 1, wherein the first layer is optically uniaxial where $|ny_1-nz_1|<0.001$.

5. The film of claim 1, wherein the first layer is a material selected from the group consisting of triacetylcellulose (TAC), cellulose diacetate, cellulose acetate butylate (CAB), cyclic polyolefin, polycarbonate, polysulfonate, polynorbomene, glass, and combinations thereof.

6. The film of claim 1, wherein an in-plane retardation Rin of said at least one first layer is between 0 nm and 300 nm.

7. The film of claim 1, wherein an in-plane retardation Rin of said at least one first layer is between 10 nm and 275 nm.

8. The film of claim 1, wherein a thickness of said at least one first layer is between 5 μm and 100 μm.

9. The film of claim 1, wherein a thickness of said at least one first layer is between 20 μm and 100 μm.

10. The film of claim 1, wherein $\Delta n_{int}$ and S of said amorphous polymer are both negative, where $\Delta n_{int}$ is an intrinsic birefringence of the amorphous polymer and S is an order parameter of a polymer segment of the amorphous polymer.

11. The film of claim 10, wherein $-0.5<S<0$.

12. The film of claim 1, wherein a non-visible chromophore group is off of the backbone of said amorphous polymer.

13. The film of claim 12, wherein said amorphous polymer contains off the backbone a vinyl, carbonyl, amide, imide, ester, carbonate, aromatic, sulfone, or azo group.

14. The film of claim 12, wherein the non-visible chromophore group includes a carbonyl, amide, imide, ester, carbonate, phenyl, naphthyl, biphenyl, bisphenol, or thiophene group.

15. The film of claim 12, wherein the non-visible chromophore group includes a heterocyclic or carbocyclic aromatic group.

16. The film of claim 1, wherein said amorphous polymaer is one selected from the group consisting of (A) poly (4 vinylphenol), (B) poly (4 vinylbiphenyl), (C) poly (N-vinylcarbazole), (D) poly(methylcarboxyphenylmethacrylamide), (F) poly[( 1-acetylindazol-3-1-ylcarbonyloxy), ethylene], (F) poly(phthalimidoethylene), (G) poly(4-hyfroxy-1-methylpropyl) styrene), (H) poly(2-hydroxymethylstyrene), (I) poly(2-dimethylaminocarbonylstyrene), J) poly(2-phenylaminocarbonylstyrene), (K) poly(3-(4-biphenylyl) styrene), (L) poly(4-(4-biphenylyl)styrene), (M) poly(4-cyanophenyl methacrylate), (N) poly(2,6-dichlorostyrene), (O) poly(perfluorostyrene), (P) poly(2,4-diisopropylstyrene), (Q) poly(2,5-diisopropylstryene), and (R) poly(2,4,6-trimethylstyrene)or (S) copolymers of any two or more of the foregoing.

17. The film of claim 16, wherein the first layer is a polymer selected from the group consisting of triacetylcellulose (TAC), cellulose diacetate, cellulose acetate butylate (CAB), cyclic polyolefin, polycarbonate, polysulfonate, or polynorbornene.

18. The film of claim 1, wherein a thickness of said at least one second layer is less than 30 μm.

19. The film of claim 1, wherein a thickness of said at least one second layer is less than 20 μm.

20. The film of claim 1, wherein a thickness of said at least one second layer is less than 10 μm.

21. The film of claim 1, wherein an out-of-plane retardation Rth of the multilayer optical compensation film is greater than 20 nm.

22. The film of claim 1, wherein an out-of-plane retardation Rth of the multilayer optical compensation film is between 30 nm and 300 nm.

23. The film of claim 1, wherein an out-of-plane retardation Rth of the multilayer optical compensation film is between 40 nm and 200 nm.

24. A liquid crystal (LC) display comprising a liquid crystal cell, first and second crossed polarizers located on opposite sides of the cell, and at least one multilayer optical compensation film located between the first polarizer and the cell, wherein the optical compensation film comprises at least one optically anisotropic first layer and at least one optically anisotropic second layer contiguous to the first layer, wherein said first layer satisfies the relation:

$nx_1 \geq ny_1 \geq nz_1$ wherein said second layer comprises amorphous polymer with a glass transition temperature above 160° C., and satisfies the relations:

$|nx_2 - ny_2| < 0.001$ $nz_2 - (nx_2 + ny_2)/2 > 0.005$ wherein $nx_1$, $ny_1$ and $nz_1$ are indices of refractions of the first layer in x, y and z directions of the first layer, respectively, and wherein $nx_2$, $ny_2$ and $nz_2$ are indices of refractions of the second layer in x, y and z directions of the second layer, respectively.

25. The display of claim 24, wherein said amorphous polymer is one selected from the group consisting of (A) poly (4 vinylphenol), (B) poly (4 vinylbiphenyl), (C) poly (N-vinylcarbazole), (D) poly(methylcarboxyphenyl-methacrylamide), (E) poly[(1-acetylindazol-3-ylcarbonyloxy) ethylene], (F) poly(phthalimidoethylene), (G) poly(4-(1-hydroxy-1-methylpropyl) styrene), (H) poly(2-hydroxymethylstyrene), (I) poly(2-dimethylaminocarbonylstyrene), J) poly(2-phenylaminocarbonylstyrene), (K) poly(3-(4-biphenylyl) styrene), (L) poly(4-(4-biphenylyl)styrene), (M) poly(4-cyanophenyl methacrylate), (N) poly(2,6-dichlorostyrene), (O) poly(perfluorostyrene), (P) poly(2,4-diisopropylstyrene), (Q) poly(2,5-diisopropylstyrene), and (R) poly(2,4,6-trimethylstyrene)or (S) copolymers of any two or more of the foregoing.

26. The display of claim 25, wherein the first layer is a polymer selected from the group consisting of triacetylcellulose (TAC), cellulose diacetate, cellulose acetate butylate (CAB), cyclic polyolefin, polycarbonate, polysulfonate, or polynorbornene.

27. The display of claim 24, wherein the liquid crystal cell is arranged in In-Plane Switching mode.

28. The display of claim 24, further comprising another multilayer compensation film located between the second polarizer and the cell.

* * * * *